March 8, 1966     K. O. G. HEROLF     3,239,082
MEANS FOR FEEDING TREES TO A BRANCH REMOVING
MACHINE OR A DEBARKING MACHINE Filed Nov. 27, 1963     2 Sheets-Sheet 1

March 8, 1966  K. O. G. HEROLF  3,239,082
MEANS FOR FEEDING TREES TO A BRANCH REMOVING
MACHINE OR A DEBARKING MACHINE
Filed Nov. 27, 1963  2 Sheets-Sheet 2

United States Patent Office 3,239,082
Patented Mar. 8, 1966

3,239,082
MEANS FOR FEEDING TREES TO A BRANCH REMOVING MACHINE OR A DEBARKING MACHINE
Kjell Olof Gunnar Herolf, Sundsbruk, near Sundsvall, Sweden, assignor to Sunds Verkstader Aktiebolag, Sundsbruk, Sweden
Filed Nov. 27, 1963, Ser. No. 326,555
Claims priority, application Sweden, Nov. 28, 1962, 12,812/62
1 Claim. (Cl. 214—138)

In recent years the harvesting of trees has become highly mechanized. As a matter of fact there exist at present various special machines, which either both remove the branches from a tree and also fell it or which merely fell a tree. After the felling operation having been completed both trees from which the branches have been removed and trees still wearing their branches are transported to a place of processing, where they have their branches removed and/or are subjected to barking. Hitherto this transportation usually has been carried out by means of drag or yarding tractors, dragging bundles of trees behind them and delivering the trees near the place of processing. After that the trees, more or less manually, have been brought into engagement with the feeding members of the branch removing machine or the barking machine. The use of the present invention will eliminate such heavy and time-consuming work.

The invention is illustrated, diagrammatically, by means of the accompanying drawing in which—

Figure 1:
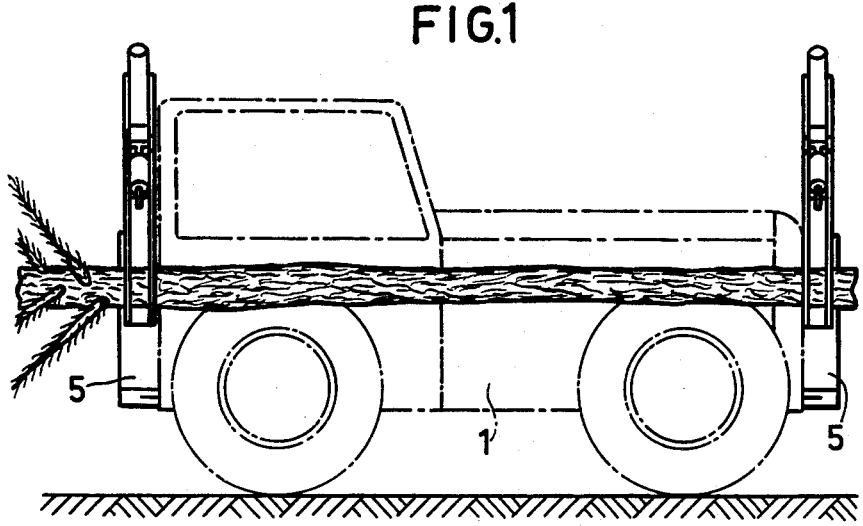
FIGURE 1 is a side elevational view showing a tractor provided with two lifting devices, FIGURE 2 being a plan view of the tractor shown in FIGURE 1 and FIGURE 3 being an end view of the same tractor.
Figure 2:
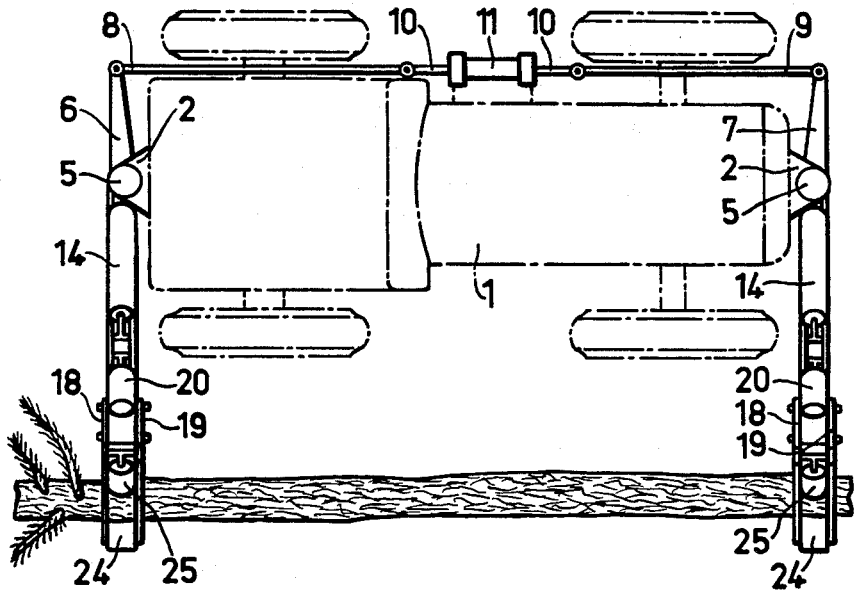

FIGURE 1 is means to illustrate a standar tractor 1 of any known convenient type. There may also be used, instead, other standard vehicles required to cope with rough ground, such as vehicles of the creeper or caterpillar type. Each tractor comprises a rigid frame. Both at the front and at the back of the tractor 1 there are provided two lugs or brackets 2, 3, carrying a shaft 4. On the shaft 4 there is turnably mounted a sleeve 5. To each sleeve 5 there is secured an arm 6 and 7, respectively, each arm being actuatable by link members 8 and 9, respectively. Said link members are articulated to a piston rod 10 of a hydraulic or pneumatic motor 11, mounted on the tractor 1. When the motor is being driven each of the two sleeves 5 will be turning just as much as the other one and in the same direction of rotation. Two identical, independently operating lifting devices are carried by the tractor 1. Each lifting device comprises an arm 12, adapted to turn on a shaft 13, which is carried by the sleeve 5. The arm 12 is adapted to be raised and lowered by means of a motor 14, which is supported by shafts 15, 16, attached to the upper portion of the sleeve 5 and, respectively, to the middle portion of the arm 12. Through that end of the arm 12 which is farthest away from the sleeve 5 there extends a shaft 17, carrying two rigidly interconnected arms 18, 19. Said arms are swingable by means of a motor 20, supported at 21, 22. Between the arms 18, 19 there is provided, at the middle portions thereof, a shaft 23, carrying gripping means 24, such as gripping jaws or claw clutches, said gripping means 24 is actuatable by means of a motor 25, supported at 26 and at 27.

When a tree is to be fed to the branch removing machine, or the barking machine, the tractor 1 is driven up to a supply of trees. When a tree has been seized by the two lifting devices, the arms 12 and 18, 19 are swung, preferably inwards towards the tractor. The tractor 1 is then driven up to the branch removing machine, or the barking machine, and is stopped when one end of the tree has reached the immediate neighborhood of the most protruding portions of the feeding-in section of the machine, such portions being respectively the branch skinning tools of the branch removing machine and the foremost feeding rollers of the barking machine. The position of the tree is then adjusted laterally and/or vertically by means of the motors 14 and 20, until the longitudinal axis of the tree acceptably concides with the direction of feed of the machine or of the feeding mechanism. When this has been accomplished the motor 11 is driven and, via the sleeves 5, it will impart to the two lifting devices a forward feeding movement, which is interrupted when the feeding device of the machine is firmly engaging the end of the tree. At the movement the tractor driver releases the lifting devices from their engagement with the tree by actuation of the motors 25 to retreat by gripping means 24. Also the positioning of the tree may be effected while the tractor is being driven towards the machine. In that case the tractor 1 is driven along a path which is substantially parallel with the direction of feed of the machine. For the purpose of facilitating this operation the tractor 1 may be driven along, and be guided by, channels, rails etc. attached to the ground and extending substantially parallel with the direction of feed of the machine. The tractor driver, by means of one, or both, of the lifting devices, only to guide the end of tree in such a manner that it will enter into engagement with the feeding rollers etc. of the branch removing machine or of the barking machine.

Figure 4:
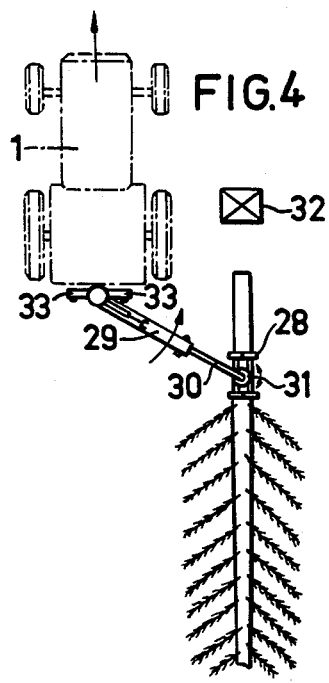
FIGURES 4 and 5 show ways of feeding trees in combination with a simplified lifting mechanism.
Figure 5:
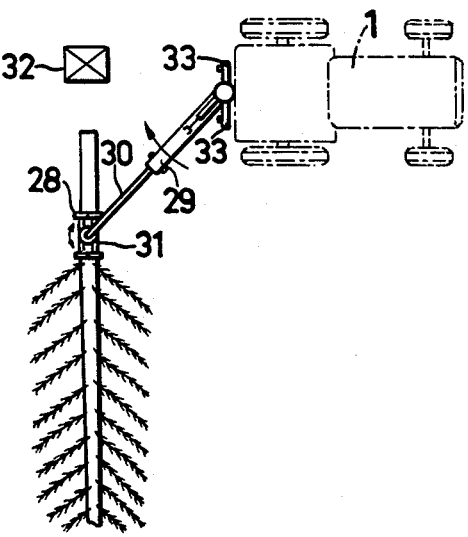

A simplified embodiment of the lifting device illustrated in FIGS. 4 and 5 comprises parts of a hydraulically driven standard excavating machine of a known construction, which is swingable an angle of more than 180° and which is mounted at the rear or fore portion of a tractor. The excavating machine may be easily converted into a tree lifting apparatus by replacing the bucket by a swingable two-jaw log gripping device 28 of a known construction. In the bar connection between the end of the lifting arm 29, 30 and the gripping device 28 there is provided either a ball joint or a universal joint. In case of a universal joint being provided there preferably is inserted, in the connection, a motor 31, which serves for imparting to the gripping device 28 and, hence, also to the tree a turning movement in relation to the articulated lifting arm 29, 30, carried by the tractor.

According to FIGURE 4 the tractor 1 is dragging a tree up to the branch removing machine or the barking machine 32, the tractor 1 being moved on either side of, and parallel with, the direction of feed of the machine 32. In order that the tree shall be able to hit the center of the machine 32, the lifting arm 29, 30 is swung out by means of motors 33. If the tractor is standing still in the position shown in FIGURE 4 the feeding of the tree is effected by the articulated lifting arm 29, 30 being swung further by means of the motors 33 in the the direction of the arrow in FIGURE 4. During this swinging movement the vertical and/or lateral position of the end of the tree is simultaneously adjusted by the lifting arm 29, 30. During this swinging movement the motor 31 may be idling, so that the gripping device 28 will automatically adjust itself in relation to the forces acting on the tree. If the tractor is moved continuously past the machine 32 the motors 33 preferably are blocked. The position of the tree in the lateral direction is then adjusted by manoeuvring the tractor in a suitable manner, and, in the vertical direction, by means of the lifting arms 29, 30.

According to FIGURE 5 the tractor 1 is to be moved right towards the machine 32, until the tractor 1 is near the feeding-in end of the machine 32. Then it is swung an angle of 90° in either direction and is stopped, for instance, in a position appearing from FIGURE 5. The motors 33 then swing the lifting arm 29, 30 in the direction of the arrow in FIGURE 5, the lifting arm 29, 30 being at the same time raised by means of motors (not shown) in such a manner that the position of the end of the tree will be adjusted in the vertical direction and/or laterally in relation to the feeding members of the machine 32 or in relation to the center of the feeding-in opening of the machine.

In case the machine 32 has no feeding members the tractor 1 or the lifting arm 29, 30 will first guide the tree into and through the feeding-in opening of the machine until the tree protrudes through the other end of the machine. After that the tractor is driven to a position, in which the gripping device 28 is able to engage firmly that end of the tree protruding from the machine 32. The tractor 1 is then moved away from the machine 32 and pulls the tree through the machine and delivers it at a log stock place.

In case the machine 32 is equipped with feeding members the gripping device 28, carried by the tractor 1, may be used for removing the skinned or barked tree. The gripping device 28 then seizes the tree at a point which is as close as possible to its center of gravity and then delivers the tree at the log stock place, the tree having then become correctly positioned by means of the motor 31 and/or the motors 33.

It should be noted that in the embodiment shown in FIGURE 4 members (not shown), provided at the fore end of the tractor 1, remove the waste from the machine 32 every time the tractor passes the machine 32.

In one embodiment (not shown in the drawing) the lifting device 28–31 has been replaced by a lifting device, consisting of the members 2–5 and 12–27. When this lifting device, which may be swingable an angle of 360° and which may be mounted on the roof of the driver's cabin, is to seize a tree, the members 18, 19 and 24 are caused to seize the tree from above at, or as close as possible to, its center of gravity. The seizing movement is effected by means of the motor 25, which swings the gripping means 24 until the tree rests very steadily against both arms 18 and 19. Hereby every point of the tree will move in a circular path when the arm 12 is being swung by means of the motors 33. In still another embodiment (not shown in the drawing) of the lifting device its seizing effect has been increased by the gripping means 24 having two arms or by each of the arms 18 and 19 carrying its gripping means 24. Towards the end of its approach to the machine 32 the tractor 1 is moved substantially parallel with the direction of feed of the machine. Preferably by means of the motors 33 the arm 12 is then swung out to such an extent that the longitudinal direction of the tree will extend substantially parallel with the direction of motion of the tractor 1. When the end of the tree is close to the feeding-in opening of the machine 32 one or both motors 14, 20 are driven until the end of the tree will be situated right before the feeding-in opening of the machine. During this fine adjustment of the position of the end of the tree the tractor may either be standing still or it may be driven in an unchanged direction. When the feed members of the machine 32 are firmly engaging the tree the motor 25 is driven in such a manner that the members 18, 19 and 24 will quickly release the tree, which will then usually drop down a little. In order to be able to get the members 18, 19 and 24 quickly out of the way, the gripping means 24 in still another embodiment (not shown) of the lifting device has been shortened to such an extent that no portion thereof will be positioned beneath the tree. In this embodiment the free ends of the arms 18 and 19 are, instead, curved a little towards the gripping means 24. The members 18, 19 and 24 preferably are of such dimensions that, when in operative positions, they are able to embrace, from above, a tree of normal thickness at an angle of more than 100°, preferably of 200–300°. When the members 18, 19 and 24 release their grip around the tree they are rapidly released therefrom because of the tree dropping a little and also because of the vehicle, and hence also the lifting device, springing upwards and raising when the load of the tree is released.

Figure 3:
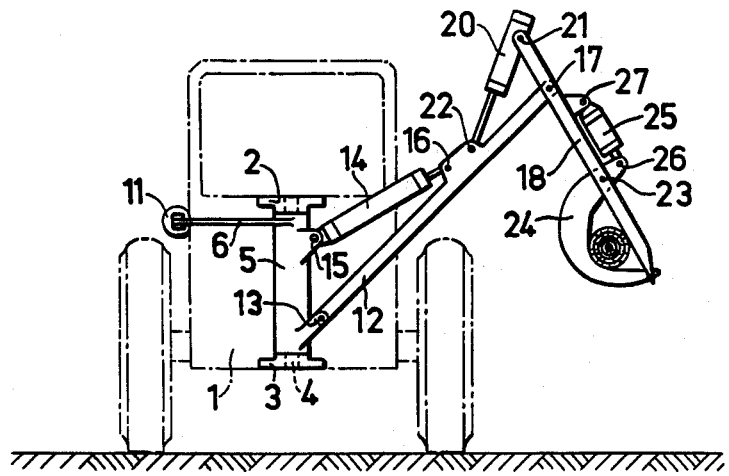

In still another embodiment (not shown) of the lifting device carried by the tractor there is no joint between the arms 12 and 18, 19 which means that the members 17 and 20–22, of FIGURE 3, have been omitted, i.e. the arms 18, 19 constitute a part of, or an extension of, the arm 12. Hereby it is possible for the tractor driver to perform the positioning of the end of the tree more quickly than would otherwise be possible if he also would have had to operate the motor 20.

In all embodiments of a tree lifting device, which is carried by a vehicle, the gripping device, seizing the tree from above, from below or from the side at at least three points, two of which are located opposite to each other, or also seizing the tree along at least two opposite, band-shaped zones, the gripping device should be constructed in such a manner as to release its engagement with the tree and also be of such construction that no portion of the gripping device will be in the way of the tree whereby a rapid movement of the tree and the gripping device, relatively to each other, is permitted.

Having now described my invention, what I claim as new and desire to secure by Letters Patent is:

Apparatus for feeding a tree trunk to a branch removing and/or debarking machine comprising a frame, and two tree-handling apparatuses attached at spaced locations on said frame, each tree handling apparatus comprising a vertically disposed shaft rigidly mounted on an end of said frame, a sleeve rotatably mounted on said shaft, a first motor mounted on said frame and connected to said sleeve and adapted to rotate said sleeve, a first arm hinged at one end thereof to said sleeve to move substantially in a vertical plane through the axis of said sleeve, a second motor hingedly connected to said sleeve and said first arm and adapted to move said first arm in said plane, a second arm pivoted to the end of said first arm, a third motor hingedly connected between said first arm and said second arm and adapted to swing said second arm relative to said first arm in said plane through the axis of said sleeve, the free end of said second arm being formed as a first gripping jaw, a second gripping jaw pivoted to said second arm in position to cooperate with said first gripping jaw and a fourth motor hingedly connected between said second arm and said second gripping jaw and adapted to move said second gripping jaw relative to said first gripping jaw, at least one of said gripping jaws being divided into spaced parallel arms so that a tree gripped by said jaws will be engaged at at least three spaced points and said gripping jaws being so shaped to permit a tree gripped thereby to fall vertically when said jaws are opened, the sleeves of the two tree handling apparatuses being operatively connected to move the gripping jaws thereof at the same rate in the same direction at one side of said frame.

(References on following page)

References Cited by the Examiner

UNITED STATES PATENTS

| | | | |
|---|---|---|---|
| 2,041,926 | 5/1936 | Herwander | 214—147 X |
| 2,576,966 | 12/1951 | Pauley et al. | 144—311 |
| 2,881,814 | 4/1959 | Avard | 144—311 |
| 2,991,891 | 7/1961 | Wills | 214—147 |
| 3,152,706 | 10/1964 | Conrad | 214—147 |
| 3,156,368 | 11/1964 | Schutte | 214—147 |

FOREIGN PATENTS 575,948   5/1959   Canada.

HUGO O. SCHULZ, *Primary Examiner.*

WILLIAM W. DYER, Jr., *Examiner.*

W. D. BRAY, *Assistant Examiner.*